United States Patent [19]

van den Nieuwelaar et al.

[11] Patent Number: 4,958,694
[45] Date of Patent: Sep. 25, 1990

[54] WEIGHING DEVICE

[75] Inventors: Adrianus J. van den Nieuwelaar, Gemert; Petrus C. H. Janssen, Wilbertoord, both of Netherlands

[73] Assignee: Stork PMT B.V., Netherlands

[21] Appl. No.: 278,608

[22] Filed: Dec. 1, 1988

[30] Foreign Application Priority Data

Dec. 1, 1987 [NL] Netherlands .................... 8702888

[51] Int. Cl.$^5$ .................... G01G 19/00; G01G 19/02
[52] U.S. Cl. .................................... 177/145; 177/163
[58] Field of Search ................................ 177/145, 163

[56] References Cited

U.S. PATENT DOCUMENTS

| 4,286,679 | 9/1981 | Schneider. | |
|---|---|---|---|
| 4,300,644 | 11/1981 | Meyn | 177/163 X |
| 4,577,708 | 3/1986 | Brook I | 177/163 X |
| 4,770,260 | 9/1988 | Brook II | 177/163 X |

FOREIGN PATENT DOCUMENTS

| 817822 | 8/1951 | Fed. Rep. of Germany. |
| 8707468 | 10/1987 | Fed. Rep. of Germany. |
| 8204222 | 1/1984 | Netherlands. |

*Primary Examiner*—George H. Miller, Jr.
*Attorney, Agent, or Firm*—Ostrolenk, Faber, Gerb & Soffen

[57] ABSTRACT

Weighing device for articles such as small slaughtered animals which are carried along a transport track and of which this movement is temporarily interrupted during determination of the weight, comprising a moveable member which is loaded by the weight, acts upon a pressure transducer and cooperates with controllable locking means.

3 Claims, 1 Drawing Sheet

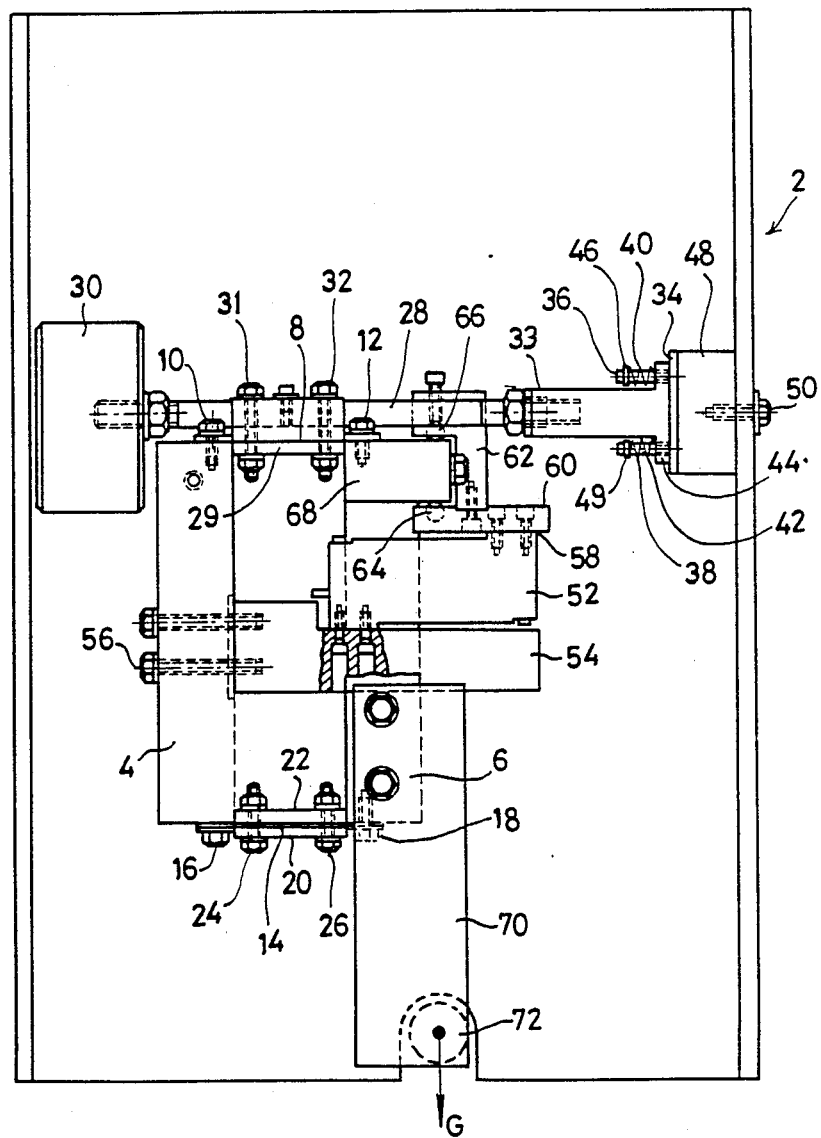

WEIGHING DEVICE

BACKGROUND OF THE INVENTION

The invention relates to a weighing device for articles such as small slaughtered animals which are carried along a transport track and of which this movement is temporarily interrupted during determination of the weight.

When weighing objects such as slaughtered animals, which are carried along on a transport track and have to be stopped temporarily for carrying out the weighing, slowing-down and acceleration forces occur which are transmitted to the weighing device and the measuring cell therein and thus falsify the result of the weighing. These forces are considerable, in particular when the interruption for the weighing is only brief and the object has thus to be stopped rapidly and brought into motion again rapidly. Moreover the weighing device has no time to come to rest and the result of the weighing will then greatly deviate from the actual weight.

SUMMARY OF THE INVENTION

The invention aims at providing a weighing device in which this drawback is overcome.

According to the invention this aim is achieved in that the device comprises a moveable member which is loaded by the weight and acts upon a pressure transducer and which cooperates with controllable locking means. These locking means are released at the moment when the animal has come to rest so that the pressure transducer is not influenced by disturbing forces.

Preferably said member is formed by a tilting arm coupled to a part of the device which is moveable and loaded by the weight to be determined, the first free end of which tilting arm carries an armature plate transverse thereto, displaceable outwardly against the spring tension, and cooperating with an electromagnet carried by the frame.

In a preferred embodiment the tilting arm is connected to a first spring strip which is firmly clamped at the end directed away from the armature plate and is connected at the other end to a transverse arm standing transversely to the tilting arm of which transverse arm the end is located at a distance below the tilting arm and is connected to one end of a second spring strip parallel to the first spring strip and reinforced by a central plate, of which the other end is clamped underneath the clamped end of the first spring strip, while the tilting arm is coupled via a pressure piece to an electrical weighing cell.

Preferably the second, free, end of the tilting arm carries a, preferably adjustable, counterweight.

The invention is illustrated with reference to the drawing. The drawing shows, in side view, an embodiment of the weighing device according to the invention.

DESCRIPTION OF A PREFERRED EMBODIMENT

The weighing device, shown in the figure, comprises a diagrammatically shown frame 2 in which a carrier bar 4 is fixed in a manner not shown in detail. A second carrier bar 6 parallel thereto is coupled thereto via an upper spring strip 8 fixed on the bars 4 and 6, respectively, with screw 10 and 12, respectively and a lower spring strip 14 fixed on bars 4 and 6 with a screw 16 and 18, respectively. The lower spring strip 14 is stiffened by the two reinforcing strips 20 and 22, fixed by bolts 24 and 26, respectively, so that only the part between the right-hand edge of the bar 4 and the left-hand edge of the strips 20 and 22 and the left-hand edge of bar 6 and the right-hand edge of strips 20, 22 is active for guiding the bar 6 in the vertical direction relative to the bar 4.

The upper strip 8 carries the tilting arm 28 which is fixed thereto by bolts 31, 32 so that here again only a short part of the spring strip 8 is active as tilting guide. Here again there is a reinforcing strip 29.

The arm 28 carries at its left end the adjustable counterweight 30 and at its right end a yoke 33 with an armature plate 34 fixed thereto. The latter is guided in the yoke 33 via the guide pins 36, 38; the springs 40, 42 arranged around pins are included be the flange 44 of the yoke 33 and locking blades 46 and 49, respectively, so that the armature plate 34 is always pulled by the springs 40, 42 against the right end of the flange 44.

The electromagnet 48 which is fixed by the screw 50 to the frame 2 is located opposite the armature plate 34. A small play is present between the two parts.

The device furthermore comprises a pressure transducer or weight measuring cell 52, known per se, which is carried by the block 54 which is fixed to the bar 4 by screws 56; a pressure piece 60 which is connected with the long leg of an L-shaped pressure piece 62 is fixed on the upper weighing surface 58 of the measuring cell 52 by a screw. A pressure ball 64 is incorporated in the pressure piece 60 and a pressure ball 66 is incorporated in the short leg of the pressure piece 62; these pressure balls surround a pressure block 68 which is connected to the bar 6.

A coupling arm 70 whose underside is connected to the coupling rod 72 which is in turn in connection with an element loaded by the weight of the article to be measured, for example a poultry carcass, is fixed to the underside of the bar 6. This is symbolically shown by the arrow indicated by G.

The force exerted by the weight G is thus transmitted to the measuring cell 52 which delivers an output signal representing the weight.

As described, interfering acceleration and slowing-down forces may be exerted on the weighing device during measurement. This influence is overcome, according to the invention, by locking the tilting arm 28 prior to the measurement by energizing the electromagnet 48, as a result of which the armature plate 34 is pulled against the front face of the electromagnet 48 and the entire device is blocked. Energizing of the electromagnet 48 is canceled by means of a suitable signal which is delivered in a manner not described in detail by the transport device of the article at the moment at which the object to be weighed has come to rest and the tilting arm 28 can then move downwards together with the longitudinal bar 6 guided by the spring strips 8 and 14, respectively, so that the measuring cell 52 is loaded corresponding to the weight G. When the object follows its track and the tilting arm 28 has again arrived in the rest position, energizing of the electromagnet 48 is switched on again by a suitable control circuit as a result of which the weighing device is again locked and ready for subsequent weighing.

What is claimed is:

1. Weighing device for articles which are carried along a transport track in which movement of articles is temporarily interrupted during determination of the weight, comprising a frame, a weight measuring cell carried on the frame, a movable member which is loaded by the weight of the article and positioned to act upon the cell when weight is applied to the movable member, the movable member comprises a tilting arm coupled to a part of the device which is movable and is loaded by the weight to be determined, the tilting arm having a first free end which carries an armature plate transverse thereto, the plate being displaceable outwardly along the tilting arm; and controllable locking means which is selectively operable to draw on the movable member and prevent the member from moving and is freeable to permit the member to move when loaded by weight; the locking means comprising a spring under tension urging the arm inwardly and a cooperating electromagnetic carrier by the frame for drawing the armature plate to displace outwardly.

2. Weighing device according to claim 1, in which the said tilting arm is connected to a first spring strip which is firmly clamped at the end directed away from the armature plate and is connected at the other end to a transverse arm standing transversely to the tilting arm of which transverse arm the end is located at a distance below the tilting arm and is connected to one end of a second spring strip parallel to the first spring strip and reinforced by a central plate, of which the other end is clamped underneath the clamped end of the first spring strip, while the tilting arm is coupled via a pressure piece to an electrical weighing cell.

3. Weighing device according to claim 2, in which the second, free, end of the tilting arm carries a counterweight.

* * * * *